United States Patent [19]
Witkowski et al.

[11] Patent Number: 6,125,360
[45] Date of Patent: Sep. 26, 2000

[54] INCREMENTAL MAINTENANCE OF MATERIALIZED VIEWS CONTAINING ONE-TO-N LOSSLESS JOINS

[75] Inventors: Andrew Witkowski, Foster City; Karl Dias, San Mateo, both of Calif.

[73] Assignee: Oracle Corporation, Redwood Shores, Calif.

[21] Appl. No.: 09/109,115

[22] Filed: Jul. 2, 1998

[51] Int. Cl.[7] .................................................. G06F 17/30
[52] U.S. Cl. ...................... 707/2; 707/2; 707/4; 707/6; 707/102; 707/103
[58] Field of Search .................................. 707/2–4, 6–7, 707/10, 102, 103; 705/26–27, 34; 706/16; 709/204; 717/2

[56] References Cited

U.S. PATENT DOCUMENTS

| | | | |
|---|---|---|---|
| 5,584,024 | 12/1996 | Shwartz | 707/4 |
| 5,812,840 | 9/1998 | Shwartz | 707/4 |
| 5,970,482 | 10/1999 | Pham et al. | 706/16 |
| 5,974,407 | 10/1999 | Sacks | 707/2 |
| 5,991,754 | 11/1999 | Raitto et al. | 707/2 |

OTHER PUBLICATIONS

Bhargava, Gautam et al., "Hypergraph based recordings of outer join queries with complex predicates", Proceedings of the 1995 ACM SIGMOND International Conference on Management of Data and Symposium on Principles of Database Systems, May 22–25, 1995, AC.

Bhagrava, Gautam et al., "Efficient proceedings of outer joins and aggregate junctions", Proceedings of the Twelfth International Conference on Data Engineering, 1996., Feb. 26–Mar. 1, 1996, pp 441–449.

Biggs, Maggie, "Oracle8 still in pole position", InfoWorld, Framingham; Dec. 15, 1997, vol. 19, Issue 50, p. 1, 97, ISSN: 01996649, Dec. 1997.

Chen, Arbee, "Outerjoin Optimization in Multidatabase Systems", Proceedings of the Second International Symposium on Database in Parallel and Distributed Systems, 1990, Jul. 2–4, 1990, pp 211–218.

Lee, Byung Suk et al., "Outer joins and filters for instantiating objects from relational databases through views", IEEE Transactions on Knowledge and Data Engineering, Feb. 1994, vol. 6, Issue 1, pp 108–119.

(List continued on next page.)

*Primary Examiner*—Hosain T. Alam
*Assistant Examiner*—Shahid Alam
*Attorney, Agent, or Firm*—Hickman Palermo; Truong & Becker, LLP; Brian D. Hickman

[57] ABSTRACT

A method and apparatus are provided for performing incremental refreshes to materialized views defined by one-to-N lossless joins. Each base table of the materialized view is selected to be processed as the current "selected table". The processing of the current selected table varies depending on whether the selected table is the right side table of an outer join. If the selected table is not the right table of an outer join, then the selected table is processed by (1) deleting rows from the materialized view based on rows of the selected table that have been updated or deleted in the selected table during the batch window, and (2) inserting rows into the materialized view based on updates and inserts into the selected table that occurred during the batch window. If the selected table is the right table of an outer join, then changes made to the selected table are processed in a way that reduces the number of changes that have to be made to the materialized view. According to one embodiment of the invention, operations performed during the incremental refresh are performed by issuing database statements (e.g. SQL queries) to a database server. The incremental refresh techniques described herein are "memoryless" in that they do not require a record of the sequence of changes that were made during a batch window. Techniques are described for performing the incremental refresh steps through the use of database commands and queries.

32 Claims, 7 Drawing Sheets

OTHER PUBLICATIONS

Lo, Ming–Ling et al., "Spatial Hash–Joins", Proceedings of the 1996 ACM SIGMOND International Conference on Management of Data, Jun. 1996, pp 247–258.

Marek, Robert et al., "TID Hash Joins", Proceedings of the third international conference in Information and knowledge management, 1994, Nov. 2–, Dec. 2, 1994, pp 42–49.

Mishra, Priti et al., "Join Processing in Relational Databases", ACM Computing Surveys, vol. 24, No. 1, Mar. 1992, pp 63–113.

Pang, HweeHwa et al., "Partially Preemptble Hash Joins", Proceedings of the 1993 ACM SIGMOND international conference on Management of data, May 1993, pp 59–68.

Ross, Kenneth et al., "Materialized view maintenance and integrity constraint checking: trading space for time", Proceedings of the 1996 ACM SIGMOND international conference on Management of data, Jun. 3–6, 1996, pp 447–458.

O'Neil et al., "Multi–Table Joins Through Bitmapped Join Indices", SIGMOND Record, vol. 24, No. 3, Sep. 1995, pp 8–11.

Yan, Weipeng et al., "Performing Group–By before Join", Proceedings of the 10th International Conference on Data Engineering, 1994, Feb. 14–18, 1994, pp 89–100.

Fig. 1

TABLE 110 (R)

| | r.a | r.b |
|---|---|---|
| 114 | 1 | 1 |
| 116 | 2 | 2 |
| 118 | 3 | 3 |

TABLE 112 (S)

| | s.a | s.c |
|---|---|---|
| 120 | 1 | 0 |
| 122 | 2 | 1 |
| 124 | 4 | 2 |

| | | | | |
|---|---|---|---|---|
| 1 | 1 | 1 | 0 | 204 |
| 2 | 2 | 2 | 1 | 206 |

| | | | | |
|---|---|---|---|---|
| 1 | 1 | 1 | 0 | 252 |
| 2 | 2 | 2 | 1 | 254 |
| 3 | 3 | null | null | 256 |

Fig. 4A

BASE TABLES AT TIME T1

TABLE X

| x.row id | X.a | X.b |
|---|---|---|
| X1 | 1 | 1 |
| X2 | 2 | 2 |
| X3 | 3 | 3 |
| X4 | 4 | 4 |
| X5 | 9 | 0 |

TABLE Y

| Y.row id | Y.a | Y.b |
|---|---|---|
| Y1 | 1 | 0 |
| Y2 | 2 | 1 |
| Y3 | 4 | 1 |
| Y3 | 2 | 8 |
| Yy | Z | 8 |

Fig. 4B

MATERIALIZED VIEW AT TIME T1 (MV 400)

| | X_rid | X.a | X.b | Y_rid | Y.a | Y.b |
|---|---|---|---|---|---|---|
| R1 | X1 | 1 | 1 | Y1 | 1 | 0 |
| R2 | X2 | 2 | 2 | Y2 | 2 | 1 |
| R3 | X3 | 3 | 3 | NULL | NULL | NULL |
| R4 | X4 | 4 | 4 | Y3 | 4 | 1 |
| R5 | X5 | 9 | 0 | NULL | NULL | NULL |
| R6 | X2 | 2 | 2 | Y4 | 2 | 8 |

CHANGES MADE DURING BATCH PERIOD

CHANGES TO Y

| Row ID | OPERATION | Y.a | Y.b |
|--------|-----------|-----|-----|
| Y5 | INSERT | 3 | 1 |
| Y3 | DELETE | 4 | 1 |
| Y1 | UPDATE | 1 | 0 |
|    |        | 9 | 0 |
| Y4 | UPDATE | 2 | 8 |
|    |        | 9 | 3 |

CHANGES TO X

| Row ID | OPERATION | X.a | X.b |
|--------|-----------|-----|-----|
| X6 | INSERT | 5 | 1 |
| X3 | UPDATE | 3 | 3 |
|    |        | 7 | 0 |
| X7 | INSERT | 6 | 1 |
| X2 | DELETE | 2 | 2 |
| X7 | DELETE | 6 | 1 |

BASE TABLES AT TIME T2

TABLE X

| X.rowid | X.a | X.b |
|---------|-----|-----|
| X1 | 1 | 1 |
| X3 | 7 | 0 |
| X4 | 4 | 4 |
| X5 | 9 | 0 |
| X6 | 5 | 1 |

TABLE Y

| Y.rowid | Y.a | Y.b |
|---------|-----|-----|
| Y1 | 9 | 0 |
| Y2 | 2 | 1 |
| Y5 | 3 | 1 |
| Y4 | 9 | 3 |

Fig. 6B

MV 400 AFTER INCREMENTAL UPDATE

| rowid | X_rid | X.a | X.b | Y_rid | Y.a | Y.b |
|-------|-------|-----|-----|-------|-----|-----|
| R1 | X1 | 1 | 1 | NULL | NULL | NULL |
| R4 | X4 | 4 | 4 | NULL | NULL | NULL |
| R10 | X5 | 9 | 0 | Y1 | 9 | 0 |
| R7 | X3 | 7 | 0 | NULL | NULL | NULL |
| R8 | X6 | 5 | 1 | NULL | NULL | NULL |
| R9 | X5 | 9 | 0 | Y4 | 9 | 3 |

INCREMENTAL MAINTENANCE OF MATERIALIZED VIEWS CONTAINING ONE-TO-N LOSSLESS JOINS

RELATED APPLICATIONS

This application is related to U.S. patent application Ser. No. 09/109,782, entitled "INCREMENTAL MAINTENANCE OF MATERIALIZED VIEWS CONTAINING ONE-TO-ONE LOSSLESS JOINS" filed by Andrew Witkowski and Karl Dias on same day herewith, the contents of which are incorporated herein by reference.

FIELD OF THE INVENTION

The present invention relates to database systems, and more specifically, to the maintenance of materialized views that contain one-to-n lossless joins.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

Referring to FIG. 1, it illustrates two exemplary tables: table R (110) and table S (112). Table R has two columns, labeled "r.a" and "r.b", and table S has two columns labeled "s.a" and "s.c". To extract data from a table, users can issue queries that select columns from the table and, optionally, specify a criteria that determines which rows are to be retrieved. For example the SQL query "SELECT s.a from S WHERE s.b=2" requests the values from column s.a of table S for the rows in which the value in column s.b equals 2. In table S of FIG. 1, the only row that has the value 2 in the s.b column is row 124. Consequently, the query would cause the DBMS to return the value from the s.a column of row 124, which is 4.

For various reasons, it is not desirable for certain users to have access to all of the columns of a table. For example, one column of an employee table may hold the salaries for the employees. Under these circumstances, it may be desirable to limit access to the salary column to management, and allow all employees to have access to the other columns. To address this situation, the employees may be restricted from directly accessing the table. Instead, they may be allowed to indirectly access the appropriate columns in the table through a "view".

A view is a logical table. As logical tables, views may be queried by users as if they were a table. However, views actually present data that is extracted or derived from existing tables. Thus, problem described above may be solved by (1) creating a view that extracts data from all columns of the employee table except the salary column, and (2) allowing all employees to access the view.

A view is defined by metadata referred to as a view definition. The view definition contains mappings to one or more columns in the one or more tables containing the data. Typically, the view definition is in the form of a database query. Columns and tables that are mapped to a view are referred to herein as base columns and base tables of the view, respectively.

The data presented by conventional views is gathered and derived on-the-fly from the base tables in response to queries that access the views. That data gathered for the view is not persistently stored after the query accessing the view has been processed. Because the data provided by conventional views is gathered from the base tables at the time the views are accessed, the data from the views will reflect the current state of the base tables. However, the overhead associated with gathering the data from the base tables for a view every time the view is accessed may be prohibitive.

A materialized view, on the other hand, is a view for which a copy of the view data is stored separate form the base tables from which the data was originally gathered and derived. The data contained in a materialized view is referred to herein as ("materialized data"). Materialized views eliminate the overhead associated with gathering and deriving the view data every time a query accesses the view.

However, to provide the proper data, materialized views must be maintained to reflect the current state of the base tables. When the base tables of a materialized view are modified, computer resources must be expended to both determine whether the modifications require corresponding changes to the materialized data, and to make the required corresponding changes. Despite the high cost associated with maintaining materialized views, using a materialized view can lead to a significant overall cost savings relative to a conventional view when the materialized view represents a set of data that is infrequently changed but frequently accessed.

Views are often based on joins of two or more row sources. A join is a query that combines rows from two or more tables or views. A join is performed whenever multiple tables appear in a query's FROM clause. The query's select list can select any columns from any of the base tables listed in the FROM clause.

Most join queries contain WHERE clause conditions that compare two columns, each from a different table. Such a condition is called a join condition. To execute a join, the DBMS combines pairs of rows for which the join condition evaluates to TRUE, where each pair contains one row from each table.

To execute a join of three or more tables, the DBMS first joins two of the tables based on the join conditions comparing their columns and then joins the result to another table based on join conditions containing columns of the joined tables and the new table. The DBMS continues this process until all tables are joined into the result.

In addition to join conditions, the WHERE clause of a join query can also contain other conditions that refer to columns of only one table. These conditions can further restrict the rows returned by the join query.

An equijoin is a join with a join condition containing an equality operator. An equijoin combines rows that have equivalent values for the specified columns. Query1 is an equijoin that combines the rows of tables R and S where the value in column r.a is the same as the value in column s.a:

QUERY1

SELECT *
FROM R, S
WHERE r.a=s.a;

FIG. 2a is a block diagram of a materialized view (MV 202) whose view definition is Query1. MV 202 has two rows 204 and 206. Row 204 results from combining row 114 of table R with row 120 of table S. Row 206 results from combining row 116 of table R with row 122 of table S. Row 118 of table R does not combine with any row in table S because no row in table S has the value 3 in column s.a.

The join illustrated by Query1 is a "simple" or "inner" join. With an inner join, rows that do not satisfy the join condition are not reflected in the join result. For example, row 118 did not satisfy the join condition relative to any rows in table S, so row 118 is not reflected in the resulting materialized view 202. In contrast, an outer join returns all rows that satisfy the join condition and those rows from one table for which no rows from the other satisfy the join condition.

FIG. 2b is a block diagram illustrating a materialized view 250 that results from an outer join between tables R and S. Materialized views that are formed by joins, such as materialized views 202 and 250, are referred to herein as materialized join views. Query2 illustrates the outer join query that defines materialized view 250.

QUERY2

SELECT *
FROM R, S
WHERE r.a(+)=s.a;

Query2 differs from Query1 in that the inner join operator "=" has been replaced with the outer join operator "(+)=". The table listed on the (+) side of the outer join operator is referred to as the outer join table. In query2, table R is the outer join table. All of the rows in the outer join table are reflected in the results of an outer join, whether or not they satisfy the join criteria with any rows in the other join tables.

As illustrated in FIG. 2b, the materialized view 250 that results from the outer join includes rows 252 and 254 that are identical to rows 204 and 206 of materialized view 202, respectively. However, materialized view 250 further includes row 256 which was produced when row 118 of table R failed to satisfy the join conditions any row in table S.

As with all types of materialized views, the materialized join views must be maintained so that the data contained therein reflects the current state of the base tables. Changes made to any of the base tables may necessitate changes in the materialized join view. Changes made to the base tables may include, for example, the insertion of new rows, the deletion of existing rows, and the update of existing rows.

In general, there are two approaches to causing a materialized view to reflect changes made to its base tables. One approach, referred to as a total refresh, involves discarding the current materialized view data and recomputing the entire materialized view based on the current state of the base tables. The clear disadvantage of performing a total refresh is that the performance penalty associated with recomputing the join view every time a base table is updated may outweigh the performance benefit achieved for not having to recompute the view every time it is accessed.

The second approach for maintaining a materialized view is referred to herein as incremental maintenance. With incremental maintenance, the materialized view is not recomputed every time a base table is changed. Instead, the DBMS determines what changes, if any, have to be made to the materialized view data in order for the materialized view data to reflect the changes to the base tables. Incremental maintenance significantly reduces the overhead associated with maintaining a materialized view when, for example, changes to the base table only require the insertion or deletion of a single row within the materialized view.

Incremental maintenance can be either immediate or deferred. Immediate incremental maintenance requires the materialized join view to be updated to reflect a change to a base table immediately in response to the change is made to the base table. Deferred incremental maintenance allows changes to the base tables to be made over a period of time (a "batch window") without updating the materialized view. After the end of the batch window, the materialized view is updated to reflect all of the changes that were made during the batch window.

Deferred incremental maintenance of a materialized join view is difficult for a variety of reasons. First, changes may have occurred to more than one of the base tables of the materialized join view during the batch window. Second, the changes may take many forms, including insertions, deletions and updates. Third, the changes may have been made in a particular sequence that is critical to the effect of the changes. For example, a value in a base table may have been updated twice during the batch window. The sequence of the updates dictates that the value of the second update must be reflected in the materialized join view, not the value of the first update.

Based on the foregoing, it is clearly desirable to provide a method and system for performing incremental maintenance on a materialized join view. Specifically, it is desirable to provide a method and system for determining how a materialized join view should be updated in response to updates made to the base tables of the materialized join view. It is further desirable to provide a method for performing deferred incremental maintenance of materialized join views in a way that does not require a persistent tracking of the sequence of updates to the base tables. It is further desirable to provide a method for performing incremental maintenance of materialized join views that are defined by queries that contain outer joins.

SUMMARY OF THE INVENTION

A method and apparatus are provided for performing incremental refreshes to materialized views defined by one-to-N lossless joins. Each base table of the materialized view is selected to be processed as the current "selected table".

The processing of the current selected table varies depending on whether the selected table is the right side table of an outer join. If the selected table is not the right table of an outer join, then the selected table is processed by:

(1) deleting rows from the materialized view based on rows of the selected table that have been updated or deleted in the selected table during a batch window; and (2) inserting rows into the materialized view based on updates and inserts into the selected table that occurred during a batch window.

If the selected table is the right table of an outer join, then deletions to the selected table are processed by processing each row (Tj) that combines with a changed row in the selected table according to the rules:

(1) if Tj only combines in the materialized view with changed rows of the selected table, then the rows in the materialized view that contain Tj are removed from the materialized view and replaced with a row in which selected columns are set to NULL; and (2) if Tj combines in the materialized view with both changed and unchanged rows of the selected table, then the rows in the materialized view that result from Tj combining with changed rows are deleted, leaving only the rows in which Tj combines with unchanged rows of the selected table.

If the selected table is the right table of an outer join, then insertions to the selected table are performed by (1) removing from the materialized view any rows that exist in the materialized view for rows from the left side of the outer join that, prior to the batch window, did not combine with any rows of the selected table but which, after the batch window, combine with at least one changed row of the selected table; and (2) inserting into the materialized view rows formed by combinations that result from the changed rows in the selected table.

According to one embodiment of the invention, operations performed during the incremental refresh are performed by issuing database statements (e.g. SQL queries) to a database server.

The incremental refresh techniques described herein are "memoryless" in that they do not require a record of the sequence of changes that were made during a batch window. Techniques are described for performing the incremental refresh steps through the use of database commands and queries.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of two tables;

FIG. 2a is a block diagram of the result of an inner join on the tables illustrated in FIG. 1;

FIG. 2b is a block diagram of the result of an outer join on the tables illustrated in FIG. 1;

FIG. 4a is a block diagram of two base tables at time T1;

FIG. 4b is a block diagram of a materialized view defined by an outer join on the base tables in FIG. 4a at time T1;

FIG. 4c illustrates changes made to the tables in FIG. 4a during a batch period;

FIG. 6a is a block diagram of the tables from FIG. 4a at time T2, after the changes shown in FIG. 4c have been made;

FIG. 6b is a block diagram of the materialized view of FIG. 4b after it has been incrementally refreshed according to an embodiment of the invention.

DETAILED DESCRIPTION OF THE PREFERRED EMBODIMENT

A method and apparatus for performing deferred incremental maintenance of materialized join views is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 3:
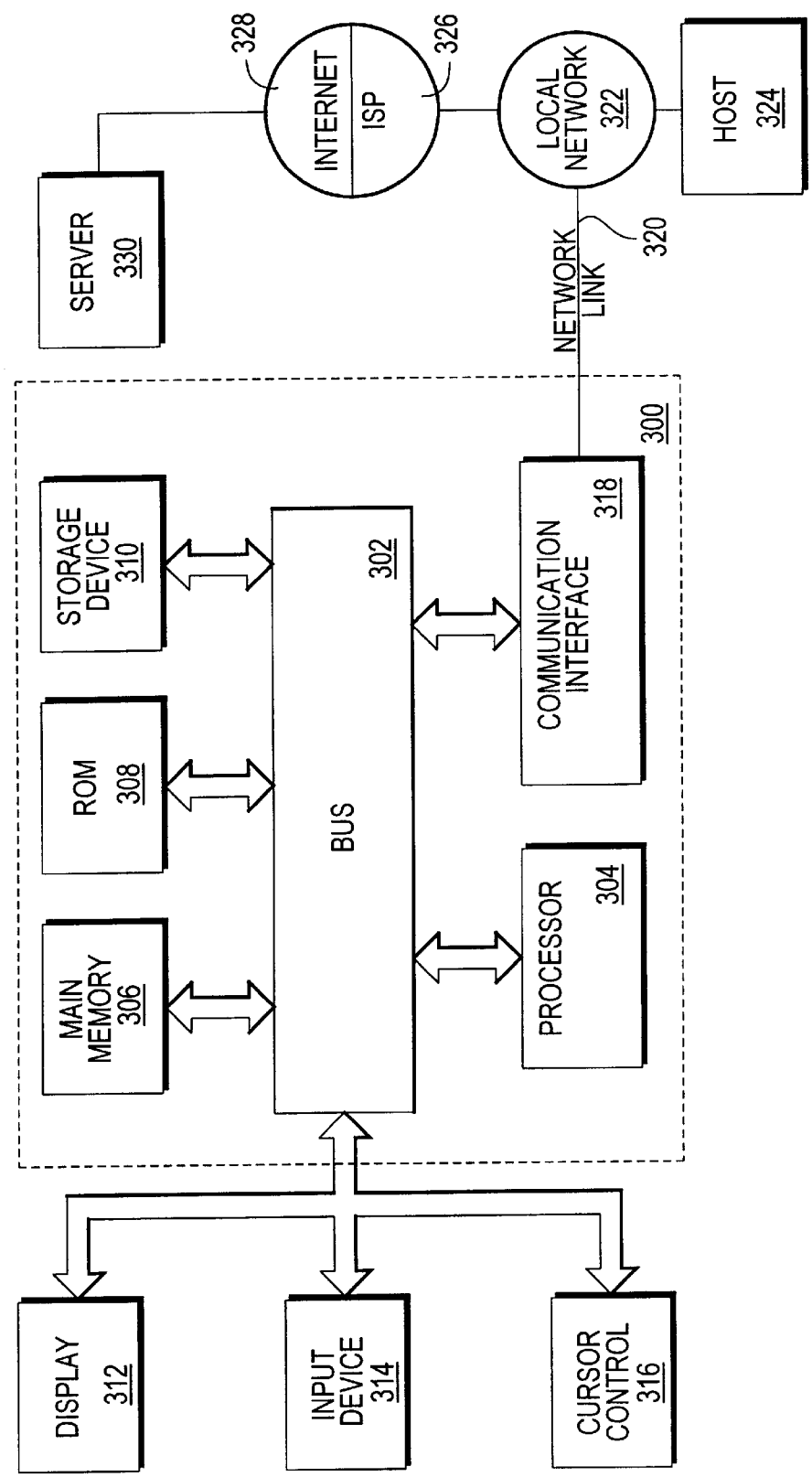
FIG. 3 is a block diagram of a computer system on which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for performing deferred incremental maintenance of materialized join views. According to one embodiment of the invention, deferred incremental maintenance of materialized join views is performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for deferred incremental maintenance of materialized join views as described herein.

The received code may be executed by processor 304 as it is received, and/or stored in storage device 310, or other non-volatile storage for later execution. In this manner, computer system 300 may obtain application code in the form of a carrier wave.

TERMS AND NOTATION

For the purpose of explanation, the following terms and conventions are used herein to describe embodiments of the invention:

The notation "><" is used herein as an inner join operator. Thus, T1><T2 indicates an inner join between tables T1 and T2.

The notation "→" is used herein as an outer join operator. Thus, T1→T2 indicates an outer join between tables T1 and T2, where table T1 is the outer table.

A join between T1 and T2 is referred to as a "lossless join" when all rows in T1 are reflected in the result of the join. The join that produced materialized view 202 is not a lossless join because row 118 of table R is not reflected in materialized view 202. The join that produced materialized view 250 is a lossless join because all of the rows of table R are reflected in materialized view 250. All outer joins are lossless joins by definition because all rows in the outer table of an outer join are always reflected in the result of the outer join.

A join between T1 and T2 is referred to as a "one-to-one join" when rows in T1 combine with no more than one row in T2. The joins that produced materialized views 202 and 250 are both one-to-one because no row in table R is joined to more than one row in table S. However, if for example table S had a row X where s.a equals 2 and s.c equals 7, then row 116 would combine with both that row X and row 122. Because table R would have a row that combined with more than one row from table S, a join between the two tables would not be a one-to-one join.

One way to ensure that a join between T1 and T2 will be one-to-one is to impose a uniqueness constraint on the join column of T2. If all values in the join column of T2 are unique, then no more than one row in T2 will have a value in its join column that matches any given value in the join column of T1.

A join between T1 and T2 is referred to as a "one-to-N join" when no constraints prevent rows in Ti from combining with more than one row in T2.

Based on the foregoing definitions, a join between T1 and T2 is a "one-to-N lossless join" when all rows of T1 are reflected in at least one row produced by the join.

The label "MV" is used to refer to a materialized join view. The query defining an MV has the form:

```
MV: select
      <sel-cols>
    from
      T1, T2, T3, . . . , Tn
    where
      <join_preds>
```

In this query definition, T1, T2, . . . , Tn are the base tables of MV. <sel-cols> are the columns in the select clause. <join_preds> are the join predicates of the form T1.a=T2.a or T1.a=T2.a(+). Join predicates are in a conjunctive form.

The MV stores rowids of the base table columns that are listed in <sel-cols> and the join columns that are listed in <join_preds>. The notation MV.Ti_rid refers to the column in MV that stores the rowid values from a particular table Ti.

The rowid value stored in the rowid column of a given row in the MV is used to uniquely identify the row in Ti that combined to form the given row in the MV. Consequently, any other column or set of columns of Ti that is subject to uniqueness and non-null constraints may be used for this purpose instead of the rowid column.

OJGraph(T1) is used to refer to the part of the join of a query Q that is reachable from T1 by either inner joins or left outer joins. For example, given the join S←L→O→C, OJGraph(O) is equal to O→C.

When the same table is not allowed to be the right side of two different left outer joins, the following statement holds true:

if there exists a Tj, such that Tj→Ti, then

Tj→OJGraph(Ti) is a valid subgraph of the Join-graph of Q and furthermore this graph is unique for a given Ti.

The subgraph Tj→OJGraph(Ti) is indicated by the notation POJGraph(Ti). For example, given the join S←L→O→C, POJGraph(O) is equal to L→O→C. If Ti is not the outer table of any outer join then POJGraph(Ti)= OJGraph(Ti)

The notation ~OJGraph(Ti) is used to refer to the complement of OJGraph(Ti). Thus, ~OJGraph(Ti) =Join_Graph (Q)—OJGraph(Ti).

Dlt_Tn is a table which contains the rowids of the rows in table Tn which have changed. Dlt_Tn is referred to herein as the "delta table" for table Tn.

VTn denotes a view on table Tn which produces the rows from Tn which have changed.

SCN refers to a System Change Number. A system change number is a logical number assigned to transactions in commit time order. Each change is associated with the scn of the transaction that performed the change. The scn associated with a change indicates the logical time at which the change was made within the database.

THE INCREMENTAL REFRESH OPERATION

Figure 5:
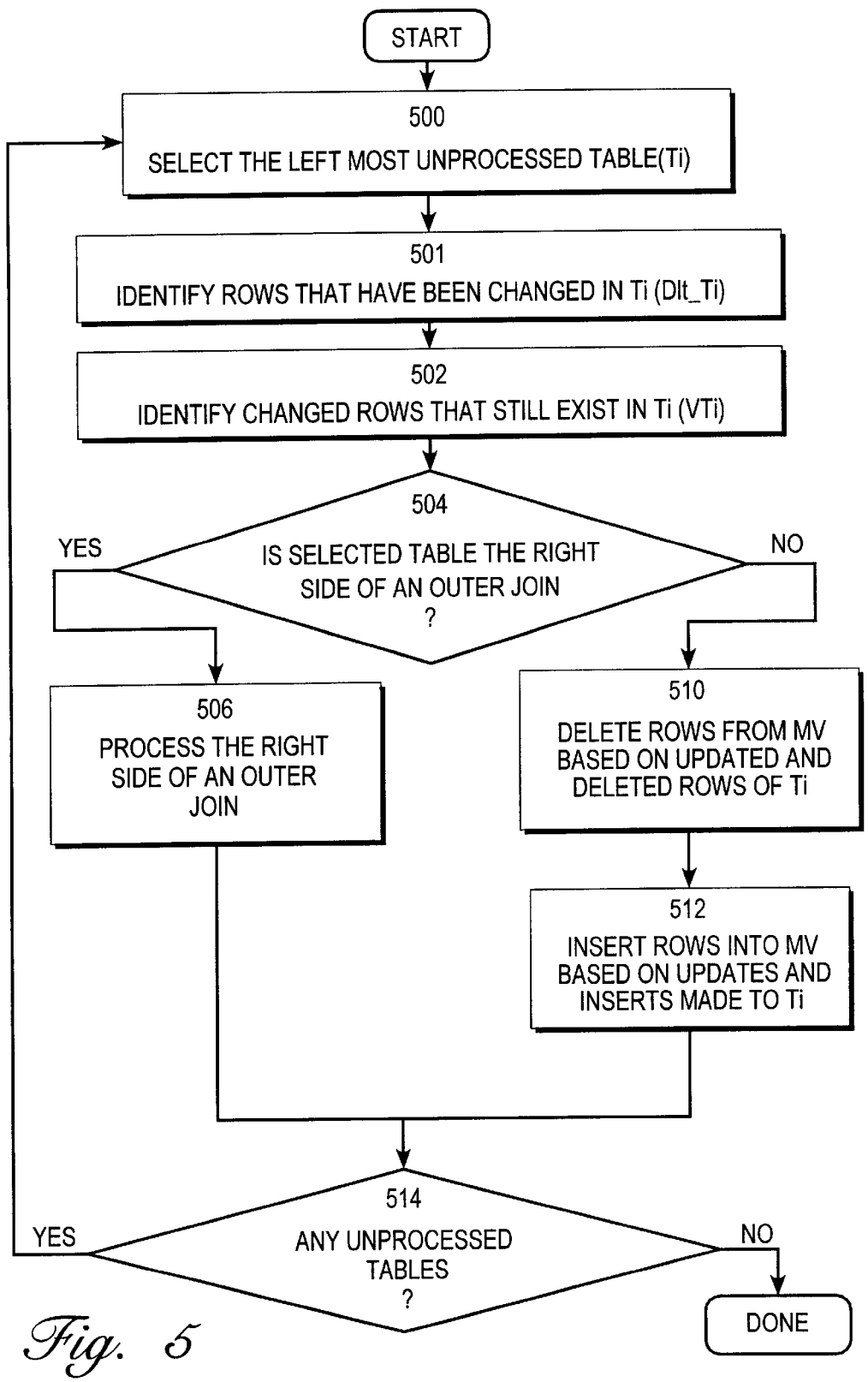
FIG. 5 is a flowchart that illustrates the steps involved in an incremental refresh operation according to one embodiment of the invention.

Referring to FIG. 5, it is a flow chart that illustrates the steps involved in an incremental refresh operation according to one embodiment of the invention. Incremental refresh is performed by applying Dlt_Ti to MV. According to one embodiment, there is a partial order in application of Dlt_Ti. Specifically, if Ti is a right side of an outer join Tj→Ti, then DIt_Tj is applied before Dlt_Ti.

At step 500, the leftmost unprocessed table listed in the join query that defines the materialized view to be refreshed is selected. Thus, if the join query is T1→T2, and neither T1 nor T2 have yet been processed, then T1 is selected during step 500. During the second iteration of step 500, T1 will have already been processed, so T2 will be selected.

At step 501, the membership of the rowid set Dlt_Ti is determined. The rowid set Dlt_Ti includes the rowids of all rows of the selected table that have undergone any change since the last refresh operation. Various techniques may be used to establish Dlt_Ti. For the purposes of explanation, it shall be assumed that the database system maintains a "delta table" SNLog_Ti that stores, for each changed row of table Ti, (1) the rowid of the changed row, and (2) the scn that indicates the logical time at which the row was changed.

Assuming that the last refresh of a materialized view occurred at a time "Last_Refresh_SCN" and that the current refresh is intended to update the materialized view to reflect the time "Current_Start_SCN", the membership of Dlt_Ti may be established according the database query:

```
Dlt_Ti = select unique rid from SNLog_Ti
    where
        scn > :Last_Refresh_SCN and
        scn < :Current_Start_SCN;
```

After the membership of Dlt_Ti is established, control passes to step 502. At step 502, the changed rows that still exist in the currently selected table are retrieved. This set of these rows is referred to as VTi. VTi may be established using the database query:

```
VTi = select Ti.* from Ti, Dlt_Ti
    where
        Ti.rowid = Dlt_Ti.rid;
```

Some changed rows may no longer exist in the selected table at the time the incremental refresh of the materialized view is being performed. Specifically, changed rows include rows that have been deleted, as well as rows that have been updated and inserted. The rowids of deleted rows will be returned in Dlt_Ti, but the deleted rows themselves will not be part of VTi, since VTi is generated by executing a query on the selected table after the deleted rows have been removed from the table.

After the membership of VTi is established, control passes to step 504. At step 504, it is determined whether the selected table is the right side of an outer join. If the selected table is the right side of an outer join, control passes to step 506. If the selected table is not the right side of an outer join, control passes to step 510.

Figure 7:
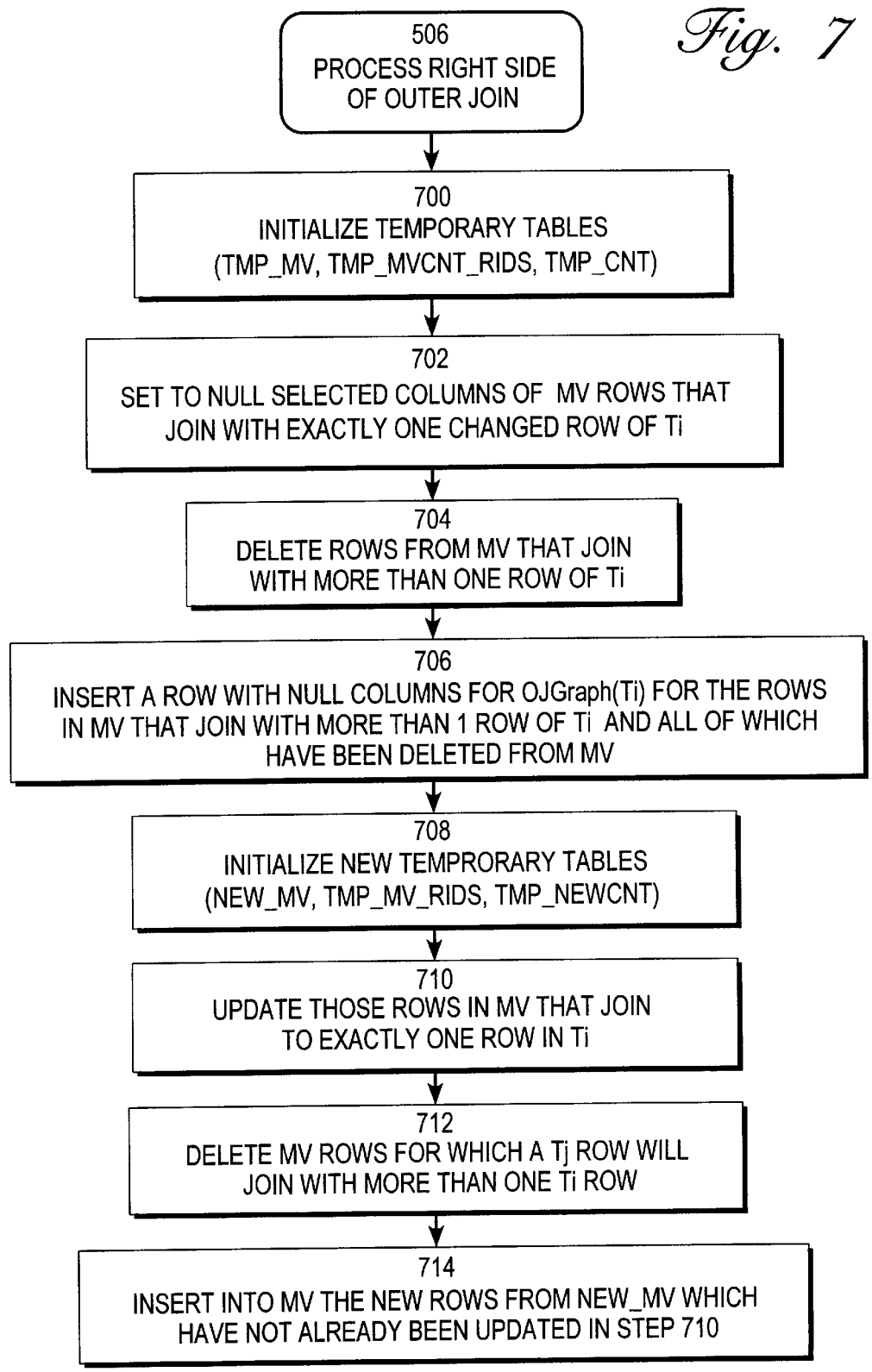
FIG. 7 is a flowchart that illustrates the steps for processing the right side of an outer join during an incremental refresh according to an embodiment of the invention.

At step 506, the right side of an outer join is processed. The various steps for processing the right side of an outer join are illustrated in FIG. 7. Referring to FIG. 7, steps 700–706 are performed to update MV to reflect deletions that have occurred in the selected table (Ti) during the batch window. Steps 708–714 are performed to update MV to reflect insertions that have been made into the selected table during the batch window. Hence, if no deletions have occurred in Ti during the batch window, steps 700–706 may be skipped. Similarly, if no insertions have occurred in Ti during the batch window, then steps 708–714 may be skipped. In this context, each update constitutes both an insert (of the new values) and a deletion (of the old values).

At step 700, three sets of information are generated. The three sets of information are as follows:

Tmp_mv=a list of rowid combinations <Tj_rid, Ti_rid> such that Ti_rid is the rowid of a row in Ti that has changed, and Tj_rid is a rowid of a row in Tj (the left side of the outer join) that combines with Ti_rid in MV. For example, assume that a row Ti1 was changed, and that MV had two rows that resulted from rows Tj1 and Tj2 combining with Ti1. Under these circumstances, Tmp_mv would contain the rowid combinations <Tj1, Ti1> and <Tj2, Ti1>.

Tmp_mvcnt_rids=a list of tuples<Tj_rid, count> such that Tj_rid is the rowid of a row in Tj that is combined in MV with any changed row in Ti, and count is the number of rows in MV that result from the combination Tj_rid with rows in other tables. For example, assume that MV has three rows that include the value Tj1, and that those three MV rows are the result of Tj1 combining with Ti1, Ti5 and Ti8. Further assume that at least one of Ti1, Ti5 and Ti8 is a changed row. Under these circumstances, Tmp_mvcnt_rids would contain a tuple<Tj1, 3>.

Tmp_cnt=a list of three-tuples <Tj_rid, dif, count> such that Tj_rid is the rowid of a row in Tj that is combined in MV with any changed row in Ti, and count is the number of rows in MV that result from the combination Tj_rid with rows in other tables. Dif is the number of rows in MV that include Tj and which are the result of Tj combining with a row in Ti that is not changed. For example, assume that MV has three rows that include the value Tj1, and that those three MV rows are the result of Tj1 combining with Ti1, Ti5 and Ti8. Further assume out of the three rows Ti1, Ti5 and Ti8, only Ti1 is a changed row. Under these circumstances, Tmp_mvcnt_rids would contain the three-tuple <Tj1, 2, 3>.

According to one embodiment of the invention, the three sets of information described above are gathered into temporary tables (Tmp_mv, Tmp_mvcnt_rids, and Tmp_cnt) by issuing database statements in SQL. The Tmp_mv table is a table that contains the old rows in the MV that need to be acted upon during the incremental refresh. Tmp_mv is created based on MV_rid, Tj_rid, Ti_rid, and mv-columns-of (~OJGraph(Ti)). Tmp_mv may be created according to the statement:

```
Tmp_mv = select rowid, Tj_rid, Ti_rid from MV
    where
        Ti_rid in (select rid from Dlt_Ti);
```

This statement creates a table named Tmp_mv with three columns: rowid, Tj_rid and Ti_rid. Values for all three columns come from the MV. One row is created in Tmp_mv from every row in MV that has a rowid that exists in Dlt_Ti. Since Dlt_Ti includes the rowids of all rows of the selected table that have undergone any change since the last refresh operation, Tmp_mv includes a row for every row of MV that includes values that originated from rows in the selected table that have undergone any change since the last refresh operation.

The Tmp_mvcnt_rids table includes two columns: Tj_rid and count. The Tj_rid column contains rowids of the table on the left side of the outer join (Tj). The count column indicates how many rows of the selected table are combined with each row of Tj. Tmp_mvcnt_rids may be created by the statement:

```
* Create table Tmp_mvcnt_rids(Tj_rid, count)
Tmp_mvcnt_rids = select Tj_rid, count(*) from MV
    where
        Tj_rid in (select Tj_rid from Tmp_mv) and
        Ti_rid not null
    group by Tj_rid;
```

The Tmp_cnt table includes three columns: Tj_rid, dif and count. The Tj_rid column contains the rowids of table Tj. The dif column contains the difference between the count column of the Tmp_mvcnt_rids table and the number of rows in the Tmp_mv table for a given Tj_rid. The count column contains the same values as the count column of Tmp_mvcnt_rids. Tmp_cnt can be created using the statement:

```
* Create table Tmp_cnt(Tj_rid, dif, count)
    Tmp_cnt = select a.Tj_rid, (a.count-b.count), a.count
        from Tmp_mvcnt_rids a, (select Tj_rid, count(*) from Tmp_mv
            group by Tj_rid)b
        where
            a.Tj_rid = b.Tj_rid;
```

Control proceeds from step 700 to step 702. During steps 702, 704 and 706, MV is updated such that, for any give Tj that combines with a changed row in Ti, the following holds true:

if Tj only combines in MV with changed rows of Ti, then the rows in MV that contain Tj are deleted and replaced with a single row in which selected columns are set to NULL; and if Tj combines in MV with both changed and unchanged rows of Ti, then the rows in MV that result from Tj combining with changed rows are deleted, leaving only the rows in which Tj combines with unchanged rows of Ti.

For example, assume that the only rows in MV that include Tj1 are rows:

<Tj1, 1, 1, Ti1, 1, 1>

<Tj1, 1, 1, Ti2, 1, 2>

Further assume that both Ti1 and Ti2 are changed rows. Under these conditions, MV is updated to leave only the row:

<Ti1, 1, 1, NULL, NULL, NULL>

On the other hand, assume that the only rows in MV that include Tj1 are rows:

<Tj1, 1, 1, Ti1, 1, 1>

<Tj1, 1, 1, Ti2, 1, 2>

<Tj1, 1, 1, Ti3, 1, 3>

Further assume that Ti1 and Ti2 are changed rows, but Ti3 has not been changed. Under these conditions, MV is updated to leave only the row:

<Tj1, 1, 1, Ti3, 1, 3>

According to one embodiment, the update just described is performed in three steps by issuing SQL statements to a database server. Specifically, at step 702, those rows of MV that join with exactly one changed row of Ti (the "update target rows") are updated. Specifically, the columns of MV that are in OJGraph(Ti) are set to NULL in the update target rows. The update target rows can be identified using values from the columns of Tmp_cnt. Specifically, the update target rows are identified in the Tjrid column of every row where Tmp_cnt.dif=0 and Tmp_cnt.count=1. The update can be performed according to the following statement:

```
update MV
set
column-of(OJGraph(Ti)) = null
where
    rowid in (select a.MV_rid from Tmp_mv a, Tmp_cnt b
        where
            a.Tj_rid = b.Tj_rid and
            b.dif = 0          and
            b.count = 1;
    );
```

At step 704, the rows from MV that join with more than one row of Ti are deleted. These rows (the "delete target rows") can be identified using Tmp_mv and Tmp_cnt. Specifically, a row of MV is a delete target row if the row contains a Tj.rid value that is in Tmp_mv that whose Tmp_cnt.count number is greater than one. The delete target rows may be deleted using the following statement:

```
delete from MV
    where
        rowid in (select a.MV_rid from Tmp_mv a, Tmp_cnt b
            where
                a.Tj_rid = b.Tj_rid and
                b.count > 1;
        );
```

At step 706, a row with null cols for OJGraph(Ti) is inserted for (1) those rows in MV which join with more than 1 row of Ti and (2) all of which have been deleted in step 704. Assuming that Tj→OJGraph(Ti) is a valid outer join, this insertion can be performed using the statement:

```
insert into MV
select a.mv-columns-of(~OJGraph(Ti)), (mv-columns-of(OJGraph(Ti)=
null))
    from Tmp_mv a, Tmp_cnt b
where
    a.Tj_rid = b.Tj_rid and
    b.dif =0           and
    b.count > 1;
```

Control proceeds from step 706 to step 708. During steps 708–714, MV is updated to reflect inserts into the selected table (Ti) that occurred during the batch window. Specifically, Ti is updated such that new rows that result from the combination of Tj with the new rows of Ti are inserted into MV. In addition, MV rows that exist because a particular row of Tj did not previously combine with any row of Ti are removed if that particular row of Tj combines with a changed row of Ti. For example, assume that MV included the row:

<Tj1, 1, 1, NULL, NULL, NULL> because Tj1 did not combine with any row of Ti prior to the batch window. Further assume that during the batch window a row <Tj8, 1, 8> was created in Ti (either through an insertion or an update). Under these circumstances, MV will be updated to replace the row <Tj1, 1, 1, NULL, NULL, NULL> with the row

<Tj1, 1, 1, Tj8, 1, 8>

At step 708, a second initialization phase is performed where three new tables are created. The three tables, New_mv, Tmp_mv_rids, and Tmp_newcnt, may be used to perform the operations associated with the subsequent steps 710, 712 and 714. The table New_mv consists of all the updated/new rows to be added to MV, and may be created according to the statement:

```
New_mv = select <sel-cols> . . . with all Ti replaced by VTi
    from
        T1, T2, T3, . . . , Ti, . . . , Tn
    where
        <join-preds> ; . . . with all Ti replaced by VTi
```

The table Tmp_mv_rids contains the rowids of the rows in table Tj that (1) are combined in MV with a row from Ti, and (2) also combine with a changed row of Ti. Tmp_mv_rids may be created according to the statement:

```
Tmp_mv_rids = select Tj_rid from MV
    where
        Tj_rid in (select Tj_rid from New_mv) and
        Ti_rid not NULL
    ;
```

The table Tmp_newcnt specifies the number of times a Tj row combines with new or updated rows of Ti. Tmp_newcnt may be created according to the statement:

```
* Create table Tmp_newcnt(Tj_rid, count)
Tmp_newcnt = select Tj_rid, count(*)
```

```
    from New_mv
        group by Tj_rid;
```

Control proceeds from step 708 to step 710. At step 710, the rows in MV which join with exactly one changed (updated or inserted) row that currently exists in Ti are updated to replace null values with values that reflect the new values of the changed row. These rows may be identified using the tables created in step 708 based on the expression (Tmp_newcnt.count=1 and Tmp_newcnt.Tj_rid not in Tmp_mv_rids). Specifically, the update may be performed according to the statement:

```
update MV
    (select
        mv-columns-of-OJGraph(Ti), columns-of(OJGraph(Ti))
        from
            MV, New_mv, Tmp_newcnt
        where
            Tmp_newcnt.count=1 and
            Tmp_newcnt.Tj_rid not in (select Tj_rid from Tmp_mv_rids)
        and
            New_mv.Tj_rid = Tmp_newcnt.Tj_rid and
            MV.Tj_rid = New_mv.Tj_rid
    )
set
    mv-columns-of-OJGraph(Ti) = columns-of(OJGraph(Ti));
```

At step 712, selected rows are deleted from MV. The rows deleted from MV during step 712 are those rows that are derived from a Tj row that joins with no unchanged row of Ti and more than one changed Ti row. For example, assume that prior to the batch window, row Ti1 did not combine with any row of Tj. Thus, MV would contain the row:

<Ti1, 1, 1, NULL, NULL, NULL>

Assume that after the batch window, Ti1 combines with two rows Tj1 and Tj5 in Tj. Under these conditions, the row <Ti1, 1, 1, NULL, NULL, NULL> will be deleted during step 712.

The rows to be deleted during step 712 will currently have null Ti_rid values. The rows to be deleted in this step may be identified using the tables created in step 708 based on the expression (Tmp_newcnt.count>1 and Tmp_newcnt.Tj_rid not in Tmp_mv_rids). Specifically, the deletion may be performed according to the statement:

```
delete from MV
    where
        MV.Tj_rid in (select Tj_rid from Tmp_newcnt
            where
                Tmp_newcnt.count>1 and
                Tmp_newcnt.Tj_rid not in
                    (select Tj_rid from Tmp_mv_rids)
        );
```

During step 714, the new rows from New_mv which have not already been updated in step 710 are inserted into MV. The rows to be inserted may be identified using the expression Tmp_newcnt.count>1. Specifically, the insertion may be performed according to the statement:

```
insert into MV
    select New_mv.* from New_mv, Tmp_newcnt
    where
        New_mv.Tj_rid= Tmp_newcnt.Tj_rid and
        Tmp_newcnt.count > 1;
```

Upon completion of step 714, the processing of the right side of the outer join (step 506) is completed and control passes to step 514. At step 514, it is determined whether any base tables of the MV have not yet been processed. If any tables have not yet been processed, control returns to step 500 and the next unprocessed base table is processed. If all base tables have been processed, control proceeds to step 516.

As mentioned above, control proceeds from step 504 to step 510 if the selected table is not a right side of an outer join. Therefore, control proceeds to step 510 when Ti is a left side on an outer join Ti→Tj or is either side of an inner join Ti><Tj. At step 510, rows in the materialized view that are derived from rows in the selected table that have been changed are removed from the materialized view. This removal can be performed according to the statement:

delete MV
where
    MV.Ti_rid in (select rid from Dlt_Ti);

Control proceeds from step 510 to step 512. At step 512, the rows that were removed in step 510 are recalculated. This recalculation may be performed according to the following statement:

```
insert into MV
select
    <sel-cols>        . . . with all Ti replaced by VTi
from
    VTi, T2, T3, . . . , Tn
where
    <join-preds>;     . . . with all Ti replaced by VTi
```

Control proceeds from step 512 to step 514. At step 514, it is determined whether there are any unprocessed base tables of the materialized view. If any base tables have not yet been processed, then control returns to step 500. Otherwise, control proceeds to step 516, and the incremental refresh process is complete.

EXAMPLE

For the purpose of explanation, an exemplary application of the incremental maintenance process set forth above shall be given with reference to tables X and Y, illustrated in FIG. 4a. Referring to FIG. 4a, table X includes two columns x.a and x.b and a pseudo-column "X.rowid". The pseudo-column contains a unique identifier for each row in table X. The pseudo-column may, for example, simply represent the addresses of the actual storage locations at which the rows are stored. Similar to table X, table Y includes two columns y.a and y.b and a pseudo-column Y.rowid.

FIG. 4a represents the tables X and Y at a particular point in time (T1). At time T1, table X has five rows, with corresponding rowids of x1 to x5, and table Y has four rows, with corresponding rowids y1 to y4.

FIG. 4b illustrates a materialized join view MV 400 created by performing a join on tables X and Y. The defining query for MV 400 is:

QUERY3

SELECT *
FROM X, Y
WHERE x.a(+)=y.a;

The MV 400 illustrated in FIG. 4b is current as of time T1. Therefore, it accurately represents the results produced by executing Query3 on tables X and Y at time T1. MV 400 includes the columns of the base tables X and Y, as well as the pseudo-columns X.rowid and Y.rowid.

Query3 is an outer join. Consequently, the join produced by applying the query to tables X and Y are lossless (all rows of table X are reflected in MV 400). In addition, rows of X are allowed to combine with more than one row of Y. For example, row X2 combines with rows Y2 and Y4 of table Y. Therefore, the join that created MV 400 is also a one-to-N join.

FIG. 4c illustrates changes made to tables X and Y between time T1 and a later time T2. Various mechanisms may be employed to identify these changes at the time an incremental refresh is to be performed. For example, snapshot logs may be used to record the changes that have been made to base tables after the most recent MV refresh. The present invention is not limited to any particular mechanism for recording changes to base tables.

In the illustrated example, five changes were made to table X and four changes were made to table Y between T1 and T2. The changes to table X include two insert operations, two delete operations, and one update operation. The changes to table Y include one insert operation, one delete operation, and two update operations. FIG. 6 illustrates tables X and Y at time T2 after the changes have been made.

At time T2, the technique described above is used to incrementally refresh MV 400 to accurately reflect the state of tables X and Y at time T2. The sequence of the incremental refresh would proceed as follows:

SELECTED TABLE=TABLE X

At step 500, the leftmost unprocessed table listed in the join query that defines the materialized view to be refreshed is selected. In the present example, none of the tables have been processed, and table X is the leftmost table in the join query, therefore table X is selected.

At step 501, the membership of Dlt_X is determined. Dlt_X is the set of rowids of the rows that have been changed in table X since the last refresh of MV 400. For the purposes of explanation, it shall be assumed that the database system maintains a "delta table" SNLog_X that stores, for each changed row of table X, (1) the rowid of the changed row, and (2) the scn that indicates the logical time at which the row was changed. The rowids of the changed rows of table X may be retrieved using the database query:

```
Dlt_X = select unique rid from SNLog_X
    where
        scn > :T1 and
        scn < :T2;
```

In this query, scn stands for the system change number associated with changes that are recorded in SNLog_X. As mentioned above, the system change number is a logical number assigned to transactions in commit time order, and which applies to all changes made by those transactions.

Executing this query returns a set of rowids Dlt_X whose membership consists of the rowids X6, X3, X7, and X2. Once the rowids of the changed rows in table X are identified, control proceeds to step 502. In step 502, VX is calculated. VX is the set of changed rows of table X that still exist in table X. VX may be calculated using the database query:

---
VX =select X.*from X, Dlt_X
where
    X.rowid = Dlt_X.rid;

---

This query, executed against the state of table X at time T2 (FIG. 6), returns two rows: <X3, 7, 0> and <X6, 5, 1>. No rows are returned for the rowids X7 and X2 because those rows do not exist in table X at time T2.

Therefore, at the end of step 502,

Dlt_X=X2, X3, X6 and X7

VX=<X3, 7, 0> and <X6, 5, 1>

After VX is generated, control passes to step 504. At step 504, it is determined whether table X is the right side of an outer join. Table X is not the right side of an outer join, so control passes to step 510.

At step 510, rows in the materialized view that are derived from rows in table X that have been changed are removed from the materialized view 400. This removal can be performed according to the statement:

delete MV
where
MV.X_rid in (select rid from Dlt_X);

This delete statement causes the rows in MV 400 that have X2, X3, X6 or X7 in column X_rid to be deleted. The deletion of these rows from MV 400 leaves three rows remaining in MV 400. The three rows remaining in MV 400 after this deletion are:

<R1, X1, 1, 1, Y1, 1, 0>
<R4, X4, 4, 4, Y3, 4, 1>
<R5, X5, 9, 0, NULL, NULL, NULL>

Control proceeds from step 510 to step 512. At step 512, the rows that were removed from MV 400 in step 510 are recalculated. To perform this recalculation, the query that defines MV is re-executed after replacing references to table X with references to the view VX. Since the view VX will typically contain many orders of magnitude fewer rows than table X, execution of the join using VX will typically involve a much lower overhead than would be required to perform a total refresh.

This recalculation may be performed according to the following statement:

---
insert into MV
select
    *
from
    VX, Y
where VX.a(+)=y.a

---

The two rows in VX, namely <X3, 7, 0> and <X6, 5, 1>, do not have values in column VX.a that combine with any values in column y.a of Table Y. Therefore, since the join is an outer join, the rows in VX are combined with Null rows to produce rows<X3, 7, 0, NULL, NULL, NULL> and <X6, 5, 1, NULL, NULL, NULL>. These newly produced rows are inserted into MV 400 by the insert statement specified above. After step 512, MV 400 has the following five rows:

<R1, X1, 1, 1, Y1, 1, 0>
<R4, X4, 4, 4, Y3, 4, 1>
<R5, X5, 9, 0, NULL, NULL, NULL>
<R7, X3, 7, 0, NULL, NULL, NULL> and
<R8, X6, 5, 1, NULL, NULL, NULL>

Control proceeds from step 512 to step 514. At step 514, it is determined whether there are any unprocessed base tables for MV 400. In the present example, MV 400 has two base tables X and Y. Table X has been processed but table Y has not yet been processed. Control therefore returns to step 500.

SELECTED TABLE=TABLE Y

At step 500, the leftmost unprocessed table listed in the join query that defines the materialized view to be refreshed is selected. In the present example, the only unprocessed table is table Y. Therefore table Y is selected.

At step 501, the membership of Dlt_Y is determined. Dlt_Y is the set of rowids of the rows that have been changed in table Y since the last refresh of MV 400. The rowids of the changed rows of table Y may be retrieved using the database query:

---
Dlt_Y = select unique rid from SNLog_Y
where
    scn > :T1 and
    scn < :T2;

---

Executing this query returns a set of rowids Dlt_Y that includes Y1, Y3, Y4 and Y5. Once the rowids of the changed rows in table Y are identified, control proceeds to step 502. At step 502, the set of still-existing changed rows of table Y (VY) is calculated using the database query:

---
VY =select Y.*from Y, Dlt_Y
where
    Y.rowid = Dlt_Y.rid;

---

This query, executed against the state of table Y at time T2 (FIG. 6), returns three rows: <Y1, 9, 0>, <Y4, 9, 3> and <Y5, 3, 1>. No rows are returned for the rowid Y3 because the row that had rowid Y3 does not exist in table Y at time T2.

Therefore, at the end of step 502,

Dlt_Y=Y1, Y3, Y4 and Y5, and

VY=<Y1, 9, 0>, <Y4, 9, 3> and <Y5, 3, 1>

After VY is generated, control passes to step 504. At step 504, it is determined whether table Y is the right side of an outer join. Table Y is the right side of an outer join, so control passes to step 506.

At step 506, table Y is processed. The various steps for processing table Y are illustrated in FIG. 7. Referring to FIG. 7, three temporary tables (Tmp_mv, Tmp_mvcnt_rids, and Tmp_cnt) are initialized. The Tmp_mv table is a table that contains the old rows in the MV that need to be acted upon during the incremental refresh. Tmp_mv is created based on MV_rid, X_rid, Y_rid, and mv-columns-of (~OJGraph (Y)). Tmp_mv may be created according to the statement:

Tmp_mv=select rowid, X_rid, Y_rid from MV
where
    Y_rid in (select rid from Dlt_Y);

At this point in the incremental refresh process, MV 400 contains the rows:

<R1, X1, 1, 1, Y1, 1, 0>
<R4, X4, 4, 4, Y3, 4, 1>

<R5, X5, 9, 0, NULL, NULL, NULL>
<R7, X3, 7, 0, NULL, NULL, NULL> and
<R8, X6, 5, 1, NULL, NULL, NULL>

Therefore, the select statement specified above would create a Tmp_mv table with the two rows:

<R1, X1, Y1>
<R4, X4, Y3>

As mentioned above, one row is created in Tmp_mv from every row in MV that has a rid that exists in Dlt_Y. Specifically, Tmp_mv includes a row for every row of MV that includes values that originated from rows in table Y that have undergone any change since the last refresh operation. Rows R1 and R4 contain values from Y1 and Y3, respectively, and Y1 and Y3 have undergone changes. Therefore, Tmp_mv includes one row for each of rows R1 and R4 of MV 400.

The Tmp_mvcnt_rids table is created by the statement:

```
* Create table Tmp_mvcnt_rids(X_rid, count)
Tmp_mvcnt_rids = select X_rid, count(*) from MV
    where
        X_rid in (select X_rid from Tmp_mv) and
        Y_rid not null
    group by X_rid;
```

This statement produces one row for every row of MV that has an X_rid value in Tmp_mv and that does not have a NULL Y_rid value. Once these rows are produced, the rows that have the same X_rid value are combined to form a single row whose "count" value indicates how many rows were combined to form the row.

At this point in the incremental refresh process, MV 400 is:

<R1, X1, 1, 1, Y1, 1, 0>
<R4, X4, 4, 4, Y3, 4, 1>
<R5, X5, 9, 0, NULL, NULL, NULL>
<R7, X3, 7, 0, NULL, NULL, NULL> and
<R8, X6, 5, 1, NULL, NULL, NULL> and Tmp_mv table is:

<R1, X1, Y1>
<R4, X4, Y3>

The rows in MV that have an X_rid value in Tmp_mv and that do not have null Y_rid values are:

<R1, X1, 1, 1, Y1, 1, 0>
<R4, X4, 4, 4, Y3, 4, 1>

Performing the group and count operations results in a Tmp_mvcnt_rids table with rows:

<X1, 1>
<X4, 1>

The Tmp_cnt table is created using the statement:

```
* Create table Tmp_cnt(X(_rid, dif, count)
Tmp_cnt = select a.X_rid, (a.count-b.count), a.count
    from Tmp_mvcnt_rids a, (select X_rid, count(*)
        from Tmp_mv
            group by X_rid) b
    where
        a.X_rid = b.X_rid;
```

The Tmp_cnt table includes three columns: X_rid, dif, and count. The X_rid column contains the rowids of table X that are in both Tmp_mvcnt_rids and Tmp_mv. In the present example, the X_rid values that qualify are X1 and X4.

The dif column contains the difference between the count column of the Tmp_mvcnt_rids table and the number of rows in the Tmp_mv table for a given X_rid. The count column contains the same values as the count column of Tmp_mvcnt_rids.

Thus, the calculation of Tmp_cnt results in:

<X1, 0, 1>
<X4, 0, 1>

Control proceeds from step 700 to step 702. During steps 702, 704 and 706, MV 400 is updated such that, for any give X that combines with a changed row in Y, the following holds true:

if X only combines in MV 400 with changed rows of Y, then the rows in MV 400 that contain X are deleted and replaced with a single row in which selected columns are set to NULL; and if X combines in MV 400 with both changed and unchanged rows of Y, then the rows in MV 400 that result from X combining with changed rows are deleted, leaving only the rows in which X combines with unchanged rows of Y.

At step 702, those rows of MV that join with exactly one changed row of Y (the "update target rows") are updated. Specifically, the columns of MV that are in OJGraph(Y) are set to NULL in the update target rows. The update target rows can be identified using values from the columns of Tmp_cnt. Specifically, the update target rows are identified in the Xrid column of every row where Tmp_cnt.dif=0 and Tmp_cnt.count=1. The update can be performed according to the following statement:

```
update MV
set
columns-of(OjGraph(Y)) = null
where
    rowid in (select a.MV_rid from Tmp_mv a, Tmp_cnt b
        where
            a.X_rid = b.X_rid and
            b.dif = 0    and
            b.count = 1;
);
```

In the present example, both rows of Tmp_cnt have a zero in the dif column and a one in the count column. The X_rid values in those rows are X1 and X4. Therefore, the rows of MV with X_rid values of X1 and X4 are update target rows. By executing the update statement, the update target rows:

<R1, X1, 1, 1, Y1, 1, 0>
<R4, X4, 4, 4, Y3, 4, 1> by setting to Null the columns that belong to OJGraph(Y). The resulting columns thus produced are:

<R1, X1, 1, 1, NULL, NULL, NULL>
<R4, X4, 4, 4, NULL, NULL, NULL>

After this update, MV 400 includes the rows:

<R1, X1, 1, 1, NULL, NULL, NULL>
<R4, X4, 4, 4, NULL, NULL, NULL>
<R5, X5, 9, 0, NULL, NULL, NULL>
<R7, X3, 7, 0, NULL, NULL, NULL> and
<R8, X6, 5, 1, NULL, NULL, NULL>

At step 704, the rows from MV that join with more than one row of Y are deleted. These rows (the "delete target rows") can be identified using Tmp_mv and Tmp_cnt. Specifically, a row of MV is a delete target row if the row contains a X.rid value that is in Tmp_mv whose Tmp_ cnt.count number is greater than one. The delete target rows may be deleted using the following statement:

```
delete from MV
    where
        rowid in (select a.MV_rid from Tmp_mv a, Tmp_cnt b
            where
                a.X_rid = b.X_rid and
                b.count > 1;
    );
```

In the present example, the Tmp_cnt table does not have any rows with a value greater than one in the count column. Therefore, there are no delete target rows.

At step 706, a row with null cols for OJGraph(Y) is inserted for (1) those rows in MV which join with more than 1 row of Y and (2) all rows which have been deleted in step 704. Assuming that X→OJGraph(Y) is a valid outer join, this insertion can be performed using the statement:

```
insert into MV
select a.mv-columns-of(~OJGraph(Y)),
       (mv-columns-of(OJGraph(Y)=null))
    from Tmp_mv a, Tmp_cnt b
where
a.X_rid = b.X_rid and
       b.dif = 0         and
       b.count > 1;
```

In the present example, no rows in MV join with more than 1 row of Y, and no rows were deleted in step 704. Therefore no rows are inserted during step 706.

At step 708, a second initialization phase is performed where three new tables are created. The three tables, New_mv, Tmp_mv_rids, and Tmp_newcnt, may be used to perform the operations associated with the subsequent steps 710, 712 and 714. The table New_mv consists of all the updated/new rows to be added to MV, and may be created according to the statement:

New_mv=select SELECT *
    FROM X, VY
    WHERE x.a(+)=VY.a;

The New_mv table resulting from this join includes the rows:

<X1, 1, 1, NULL, NULL, NULL>
  <X3, 7, 0, NULL, NULL, NULL>
  <X4, 4,4, NULL, NULL, NULL>
  <X5, 9, 0, Y1, 9, 0>
  <X5, 9, 0, Y4, 9, 3>
  <X6, 5, 1, NULL, NULL NULL>

The table Tmp_mv_rids may be created according to the statement:

```
Tmp_mv_rids = select X_rid from MV
    where
        X_rid in (select X_rid from New_mv) and
        Y_rid not NULL
    ;
```

At this point in time, MV 400 contains the rows:
  <R1, X1, 1, 1, NULL, NULL, NULL>
  <R4, X4, 4, 4, NULL, NULL, NULL>
  <R5, X5, 9, 0, NULL, NULL, NULL>
  <R7, X3, 7, 0, NULL, NULL, NULL> and
  <R8, X6, 5, 1, NULL, NULL, NULL>

The Y_rid value in all of these rows is NULL, so no rows are selected. Therefore Tmp_mv_rids=empty.

The table Tmp_newcnt may be created according to the statement:

```
* Create table Tmp_newcnt(X_rid, count) gives the number of times
a X row is in New_mv.
Tmp_newcnt = select X_rid, count(*)
    from New_mv
        group by X_rid;
```

Executing this query creates a Tmp_newcnt with the rows:
  <X1, 1>
  <X3, 1>
  <X4, 1>
  <X5, 2>
  <X6, 1>

At step 710, the rows in MV which join with exactly one row in Y are updated. These rows may be identified using the tables created in step 708 based on the expression (Tmp_newcnt.count=1 and Tmp_newcnt.X_rid not in Tmp_mv_rids). Specifically, the update may be performed according to the statement:

```
update MV
(select
mv-columns-of-OJGraph(Y), columns-of(OJGraph(Y))
    from
        MV, New_mv, Tmp_newcnt
    where
        Tmp_newcnt.count=1 and
Tmp_newcnt.X_rid not in (select X_rid from Tmp_mv_rids) and
    New_mv.X_rid = Tmp_newcnt.X_rid and
    MV.X_rid = New_mv.X_rid
    )
set
    mv-columns-of-OJGraph(Y) = columns-of(OJGraph(Y));
```

The rowids X1, X3, X4 and X6 are from the rows in Tmp_newcnt that have a count of 1. None of these rowids are in Tmp_mv_rids. The rows of MV that are associated with these rowids, which are selected for update, include:
  <R1, X1, 1, 1, NULL, NULL, NULL>
  <R4, X4, 4, 4, NULL, NULL, NULL>

After the update, MV includes the rows:
  <R1, X1, 1, 1, NULL, NULL, NULL>
  <R4, X4, 4, 4, NULL, NULL, NULL>
  <R5, X5, 9, 0, NULL, NULL, NULL>
  <R7, X3, 7, 0, NULL, NULL, NULL> and
  <R8, X6, 5, 1, NULL, NULL, NULL>

At step 712, the rows in MV for which a X row will join with more than one Y row are deleted. These rows will currently have null Y_rids. The rows to be deleted in this step may be identified using the tables created in step 708 based on the expression (Tmp_newcnt.count>1 and Tmp_newcnt.X_rid not in Tmp_mv_rids). Specifically, the deletion may be performed according to the statement:

```
delete from MV
    where
        MV.X_rid in (select X_rid from Tmp_newcnt
            where
                Tmp_newcnt.count>1 and
                Tmp_newcnt.count.X_rid not in
                    (select X_rid from Tmp_mv_rids)
    );
```

The rowid X5 is in a row in Tmp_newcnt that has a count greater than 1. X5 is not in Tmp_mv_rids. Therefore, all rows of MV that include X5 in the X_rid column are deleted. After this deletion, MV 400 includes the rows:

<R1, X1, 1, 1, NULL, NULL, NULL>
<R4, X4, 4, 4, NULL, NULL, NULL>
<R7, X3, 7, 0, NULL, NULL, NULL> and
<R8, X6, 5, 1, NULL, NULL, NULL>

During step 714, the new rows from New_mv which have not already been updated in step 710 are inserted into MV. The rows to be inserted may be identified using the expression Tmp_newcnt.count>1. Specifically, the insertion may be performed according to the statement:

```
insert into MV
    select New_mv.* from New_mv, Tmp_newcnt
        where
            New_mv.X_rid = Tmp_newcnt.X_rid and
            Tmp_newcnt.count > 1;
```

In the present example, New_mv includes two rows with X5.

<X5, 9, 0, Y1, 9, 0>
<X5, 9, 0, Y4, 9, 3>

In Tmp_newcnt, X5 is associated with a count value that is greater than 1. Therefore, the two rows of New_mv that include the X5 rowid are inserted into MV 400. After this insertion, MV 400 includes the rows:

<R1, X1, 1, 1, NULL, NULL, NULL>
<R4, X4, 4, 4, NULL, NULL, NULL>
<R7, X3, 7, 0, NULL, NULL, NULL> and
<R8, X6, 5, 1, NULL, NULL, NULL>
<R10, X5, 9, 0, Y1, 9, 0>
<R9, X5, 9, 0, Y4, 9, 3>

Upon completion of step 714, the processing of the right side of the outer join (step 506) is completed and control passes to step 514. At step 514, it is determined whether any base table has not yet been processed. In the present example, all of the base tables have been processed, so the incremental refresh operation is compete.

FIG. 6B illustrates MV 400 after the completion of the incremental refresh process. The contents of MV 400 in FIG. 6B is identical to the results produced by executing the join query definition of MV 400 on the base tables X and Y at time T2, as shown in FIG. 6A. However, the cumulative overhead incurred in performing the incremental refresh using the techniques described herein will typically be significantly less than the overhead incurred by a total refresh operation.

The sequence of steps illustrated in FIG. 5 are merely exemplary. The sequence of various steps may be altered without altering the outcome of the incremental refresh process. For example, step 502 may be performed between steps 510 and 512. This and various other alterations would be apparent to one skilled in the art. Consequently, the present invention is not limited to any particular sequence of steps for performing incremental refresh of a materialized join view.

Under certain conditions, certain steps in the incremental refresh process described above may be skipped without affecting the result of the refresh, thus increasing the speed and decreasing the overhead of the incremental refresh. For example, if, since the last refresh, the only changes made to a base table were inserts, then steps 700, 702, 704, 706 and 510 may be skipped when that base table is being processed. Similarly, if since last refresh, the only changes made to a base table were deletes or drop partitions, then steps 708, 710, 712, 714 and 512 may be skipped when that base table is being processed.

According to one embodiment of the invention, the rowids stored in the MV indicate the partition to which the row belongs. In such an embodiment, incremental refresh performance is improved when the only change since the last refresh is that a partition was dropped. Under these conditions, the rows in MV that include values from the dropped partition (the "rows of interest") are identified by inspecting the rowids in the MV. For inner joins, the rows of interest are deleted. For outer joins, some of the columns of the rows of interest are set to NULLs. In addition, if MV is partitioned in a way that parallels the partitioning of T, the same partition from MV could simply be dropped for inner joins. In both cases, no join to master tables are required.

Significantly, the incremental refresh technique described above is "memoryless". That is, it does not require information about the order of updates to the base tables. Consequently, the overhead associated with maintaining such sequencing information is avoided. In addition, the technique is idempotent in that performing an incremental refresh N times on the same data using the techniques described herein yields the same results a single incremental refresh on the data. This property is valuable when, for example, the system crashes during an incremental refresh operation. After the crash, the incremental refresh operation may be restarted from the beginning without taking into account how far the operation had progressed prior to the crash.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing, after a batch window, an incremental refresh of a materialized view defined by a lossless one-to-n join, the method comprising the steps of:

establishing a base table of the materialized view as a selected table;

if the selected table is the right table of an outer join, then updating the materialized view to reflect deletions to the selected table by processing each row (Tj) that combines with a changed row in the selected table as follows if Tj only combines in the materialized view with changed rows of the selected table, then the rows in the materialized view that contain Tj are removed from the materialized view and replaced with a row in which selected columns are set to NULL; and if Tj combines in the materialized view with both changed and unchanged rows of the selected table, then the rows in the materialized view that result from Tj combining with changed rows are deleted, leaving only the rows in which Tj combines with unchanged rows of the selected table.

2. The method of claim 1 further comprising the steps of:
if the selected table is not the right table of an outer join, then performing the steps of
deleting rows from the materialized view based on rows of the selected table that have been updated or deleted in the selected table during the batch window; and
inserting rows into the materialized view based on updates and inserts into the selected table that occurred during the batch window.

3. The method of claim 1 further comprising the steps of:
if the selected table is the right table of an outer join, then updating the materialized view to reflect insertions to the selected table by performing the steps of
removing from the materialized view any rows that exist in the materialized view for rows from the left side of the outer join that, prior to the batch window, did not combine with any rows of the selected table but which, after the batch window, combine with at least one changed row of the selected table; and
inserting into the materialized view rows formed by combinations that result from the changed rows in the selected table.

4. The method of claim 1 wherein the step of replacing with a row in which selected columns are set to NULL includes replacing with a row in which columns corresponding to OJGraph(Ti), where Ti is the selected table.

5. The method of claim 1 wherein the step of updating the materialized view to reflect deletions to the selected table includes the step of setting to NULL selected columns of rows in the materialized view that are derived from rows in left side of the join (Tj) that join with exactly one row in the selected table that was deleted.

6. The method of claim 3 wherein the step of updating the materialized view to reflect insertions to the selected table includes the step of setting NULL values in selected columns of a particular set of rows in the materialized view to new values, where the particular set of rows includes those rows that are derived from rows in left side of the join (Tj) that join with exactly one changed row in the selected table.

7. The method of claim 1 wherein the step of updating the materialized view to reflect deletions to the selected table is performed by executing queries on tables.

8. The method of claim 1 further including the steps of:
storing change data that indicates changes made to base tables of the materialized view without tracking the order of the changes,
identifying a set of changed rows based on the change data, the set of changed rows including rows of the selected table that have been changed since a previous refresh operation;
performing the step of updating the materialized view based on the set of changed rows.

9. The method of claim 1 further comprising the steps of:
determining whether, during the batch window, the only changes made to the selected table were inserts; and
if the selected table is the right table of an outer join and the only changes made to the selected table during the batch window were inserts, then skipping the step of updating the materialized view to reflect deletions.

10. The method of claim 2 further comprising the steps of:
determining whether, during the batch window, the only changes made to the selected table were inserts; and if the selected table is not the right table of an outer join and the only changes made to the selected table during the batch window were inserts, then skipping the step of deleting rows from the materialized view.

11. The method of claim 3 further comprising the steps of:
determining whether, during the batch window, the only changes made to the selected table were deletes or drop partitions; and
if the selected table is the right table of an outer join and the only changes made to the selected table during the batch window were deletes or drop partitions, then skipping the step of updating the materialized view to reflect insertions to the selected table.

12. The method of claim 1 wherein:
rowids from base tables of the materialized view are stored in the materialized view;
the rowids stored in the materialized view indicate the partitions to which corresponding rows base tables belong;
the method further includes the steps of
determining when the only change to the selected table during the batch window is that a partition was dropped;
inspecting the materialized view to identify rows of interest in the materialized view, said rows of interest being rows that include values from the dropped partition; and
deleting the rows of interest for an inner join.

13. The method of claim 1 wherein the materialized view includes a plurality of base tables, the method further comprising the steps of:
performing said incremental refresh operation by iteratively processing each of said plurality of base tables as said selected table;
detecting a crash during the incremental refresh operation prior to processing all of the plurality of base tables; and
after said crash, processing each base table again as said selected table without regard to whether the base table had been processed prior to said crash.

14. A method for performing, after a batch window, an incremental refresh of a materialized view defined by a lossless one-to-n join, the method comprising the steps of:
establishing a base table of the materialized view as a selected table;
if the selected table is the right table of an outer join, then updating the materialized view to reflect insertions to the selected table by performing the steps of
removing from the materialized view any rows that exist in the materialized view for rows from the left side of the outer join that, prior to the batch window, did not combine with any rows of the selected table but which, after the batch window, combine with at least one changed row of the selected table; and
inserting into the materialized view rows formed by combinations that result from the changed rows in the selected table.

15. The method of claim 14 further comprising the steps of:
if the selected table is not the right table of an outer join, then performing the steps of
deleting rows from the materialized view based on rows of the selected table that have been updated or deleted in the selected table during the batch window; and inserting rows into the materialized view based on updates and inserts into the selected table that occurred during the batch window.

16. A computer-readable medium bearing instructions for performing an incremental refresh, after a batch window, of a materialized, lossless, one-to-n join view, the instructions including instructions for performing the steps of:

establishing a base table of the materialized view as a selected table;

if the selected table is the right table of an outer join, then updating the materialized view to reflect deletions to the selected table by processing each row (Tj) that combines with a changed row in the selected table as follows if Tj only combines in the materialized view with changed rows of the selected table, then the rows in the materialized view that contain Tj are removed from the materialized view and replaced with a row in which selected columns are set to NULL; and if Tj combines in the materialized view with both changed and unchanged rows of the selected table, then the rows in the materialized view that result from Tj combining with changed rows are deleted, leaving only the rows in which Tj combines with unchanged rows of the selected table.

17. The computer-readable medium of claim 16 further comprising instructions for performing the steps of:

if the selected table is not the right table of an outer join, then performing the steps of deleting rows from the materialized view based on rows of the selected table that have been updated or deleted in the selected table during the batch window; and inserting rows into the materialized view based on updates and inserts into the selected table that occurred during the batch window.

18. The computer-readable medium of claim 16 further comprising instructions for performing the steps of:

if the selected table is the right table of an outer join, then updating the materialized view to reflect insertions to the selected table by performing the steps of removing from the materialized view any rows that exist in the materialized view for rows from the left side of the outer join that, prior to the batch window, did not combine with any rows of the selected table but which, after the batch window, combine with at least one changed row of the selected table; and inserting into the materialized view rows formed by combinations that result from the changed rows in the selected table.

19. The computer-readable medium of claim 16 wherein the step of replacing with a row in which selected columns are set to NULL includes replacing with a row in which columns corresponding to OJGraph(Ti), where Ti is the selected table.

20. The computer-readable medium of claim 16 wherein the step of updating the materialized view to reflect deletions to the selected table includes the step of setting to NULL selected columns of rows in the materialized view that are derived from rows in left side of the join (Tj) that join with exactly one row in the selected table that was deleted.

21. The computer-readable medium of claim 18 wherein the step of updating the materialized view to reflect insertions to the selected table includes the step of setting NULL values in selected columns of a particular set of rows in the materialized view to new values, where the particular set of rows includes those rows that are derived from rows in left side of the join (Tj) that join with exactly one changed row in the selected table.

22. The computer-readable medium of claim 16 wherein the step of updating the materialized view to reflect deletions to the selected table is performed by executing queries on tables.

23. The computer-readable medium of claim 16 further including instructions for performing the steps of:

storing change data that indicates changes made to base tables of the materialized view without tracking the order of the changes, identifying a set of changed rows based on the change data, the set of changed rows including rows of the selected table that have been changed since a previous refresh operation;

performing the step of updating the materialized view based on the set of changed rows.

24. The computer-readable medium of claim 16 further comprising instructions for performing the steps of:

determining whether, during the batch window, the only changes made to the selected table were inserts; and if the selected table is the right table of an outer join and the only changes made to the selected table during the batch window were inserts, then skipping the step of updating the materialized view to reflect deletions.

25. The computer-readable medium of claim 17 further comprising instructions for performing the steps of:

determining whether, during the batch window, the only changes made to the selected table were inserts; and if the selected table is not the right table of an outer join and the only changes made to the selected table during the batch window were inserts, then skipping the step of deleting rows from the materialized view.

26. The computer-readable medium of claim 18 further comprising instructions for performing the steps of:

determining whether, during the batch window, the only changes made to the selected table were deletes or drop partitions; and if the selected table is the right table of an outer join and the only changes made to the selected table during the batch window were deletes or drop partitions, then skipping the step of updating the materialized view to reflect insertions to the selected table.

27. The computer-readable medium of claim 16 wherein:

rowids from base tables of the materialized view are stored in the materialized view;

the rowids stored in the materialized view indicate the partitions to which corresponding rows base tables belong;

the computer-readable medium further includes instructions for performing the steps of determining when the only change to the selected table during the batch window is that a partition was dropped;

inspecting the materialized view to identify rows of interest in the materialized view, said rows of interest being rows that include values from the dropped partition; and deleting the rows of interest for an inner join.

28. The computer-readable medium of claim 16 wherein the materialized view includes a plurality of base tables, the computer-readable medium further comprising instructions for performing the steps of:

performing said incremental refresh operation by iteratively processing each of said plurality of base tables as said selected table;

detecting a crash during the incremental refresh operation prior to processing all of the plurality of base tables; and after said crash, processing each base table again as said selected table without regard to whether the base table had been processed prior to said crash.

29. A computer-readable medium comprising sequences of instructions for performing an incremental refresh, after a batch window, of a materialized view defined by a lossless one-to-n join, the computer-readable medium comprising instructions for performing the steps of:

establishing a base table of the materialized view as a selected table;

if the selected table is the right table of an outer join, then updating the materialized view to reflect insertions to the selected table by performing the steps of removing from the materialized view any rows that exist in the materialized view for rows from the left side of the outer join that, prior to the batch window, did not combine with any rows of the selected table but which, after the batch window, combine with at least one changed row of the selected table; and inserting into the materialized view rows formed by combinations that result from the changed rows in the selected table.

30. The computer-readable medium of claim 29 further comprising instructions for performing the steps of:

if the selected table is not the right table of an outer join, then performing the steps of deleting rows from the materialized view based on rows of the selected table that have been updated or deleted in the selected table during the batch window; and inserting rows into the materialized view based on updates and inserts into the selected table that occurred during the batch window.

31. A database system including:

a plurality of base tables;

a one-to-n lossless materialized join view derived from said base tables;

a mechanism for identifying changes that occur to said base tables during a batch window;

a database server configured to incrementally refresh said materialized view by performing the steps of:

establishing a base table of the materialized view as a selected table;

if the selected table is the right table of an outer join, then updating the materialized view to reflect deletions to the selected table by processing each row (Tj) that combines with a changed row in the selected table as follows if Tj only combines in the materialized view with changed rows of the selected table, then the rows in the materialized view that contain Tj are removed from the materialized view and replaced with a row in which selected columns are set to NULL; and if Tj combines in the materialized view with both changed and unchanged rows of the selected table, then the rows in the materialized view that result from Tj combining with changed rows are deleted, leaving only the rows in which Tj combines with unchanged rows of the selected table; and if the selected table is not the right table of an outer join, then performing the steps of deleting rows from the materialized view based on rows of the selected table that have been updated or deleted in the selected table during the batch window; and inserting rows into the materialized view based on updates and inserts into the selected table that occurred during the batch window.

32. A database system including:

a plurality of base tables;

a one-to-n lossless materialized join view derived from said base tables;

a mechanism for identifying changes that occur to said base tables during a batch window;

a database server configured to incrementally refresh said materialized view by performing the steps of:

establishing a base table of the materialized view as a selected table;

if the selected table is the right table of an outer join, then updating the materialized view to reflect insertions to the selected table by performing the steps of removing from the materialized view any rows that exist in the materialized view for rows from the left side of the outer join that, prior to the batch window, did not combine with any rows of the selected table but which, after the batch window, combine with at least one changed row of the selected table; and inserting into the materialized view rows formed by combinations that result from the changed rows in the selected table; and if the selected table is not the right table of an outer join, then performing the steps of deleting rows from the materialized view based on rows of the selected table that have been updated or deleted in the selected table during the batch window; and inserting rows into the materialized view based on updates and inserts into the selected table that occurred during the batch window.

* * * * *